United States Patent
Mizuike

(10) Patent No.: US 8,541,918 B2
(45) Date of Patent: Sep. 24, 2013

(54) ROTATING ELECTRICAL MACHINE AND METHOD OF MANUFACTURING THE ROTATING ELECTRICAL MACHINE

(75) Inventor: Kosuke Mizuike, Kyoto (JP)

(73) Assignee: Nidec Corporation, Kyoto (JP)

( * ) Notice: Subject to any disclaimer, the term of this patent is extended or adjusted under 35 U.S.C. 154(b) by 165 days.

(21) Appl. No.: 13/293,439

(22) Filed: Nov. 10, 2011

(65) Prior Publication Data

US 2012/0133225 A1 May 31, 2012

(30) Foreign Application Priority Data

Nov. 30, 2010 (JP) ................................. 2010-267218

(51) Int. Cl.
*H02K 21/12* (2006.01)

(52) U.S. Cl.
USPC ........................................ 310/156.08; 310/90

(58) Field of Classification Search
USPC .................... 310/71, 89–90, 156.08–156.13, 310/156.53–156.56
See application file for complete search history.

(56) References Cited

U.S. PATENT DOCUMENTS

| | | | | |
|---|---|---|---|---|
| 4,639,627 A | * | 1/1987 | Takekoshi et al. | 310/156.22 |
| 7,453,175 B2 | * | 11/2008 | Nakanishi et al. | 310/68 B |
| 7,687,957 B2 | * | 3/2010 | Ochiai et al. | 310/156.08 |
| 2006/0226719 A1 | * | 10/2006 | Nakanishi et al. | 310/68 B |
| 2008/0073992 A1 | * | 3/2008 | Kusama | 310/90 |
| 2009/0001839 A1 | * | 1/2009 | Masayuki et al. | 310/156.16 |
| 2009/0230801 A1 | * | 9/2009 | Yamada | 310/156.16 |
| 2010/0133935 A1 | * | 6/2010 | Kinugawa et al. | 310/89 |
| 2010/0283348 A1 | * | 11/2010 | Okubo | 310/156.47 |

FOREIGN PATENT DOCUMENTS

| | | |
|---|---|---|
| JP | 2002-354722 A | 12/2002 |
| JP | 2004-140951 A | 5/2004 |

* cited by examiner

*Primary Examiner* — Thanh Lam
(74) *Attorney, Agent, or Firm* — Westerman, Hattori, Daniels & Adrian, LLP

(57) ABSTRACT

A method of manufacturing a rotating electrical machine includes: fixing a rotor core to a shaft; assembling a stationary assembly in which a first bearing is fixed to a housing bottom portion of a substantially cylindrical housing member having a closed bottom and in which an annular stator is fixed to an inner circumferential surface of a cylinder portion of the housing member; inserting the rotor core into the stator; fitting an upper portion of the shaft into a second bearing supported by a bearing support member. The method further includes fixing the bearing support member to an upper portion of the housing member; and axially inserting a plurality of rotor magnets into a plurality of axially-extending hole-shaped or groove-shaped magnet holding portions formed in the rotor core, through a magnet insertion hole defined in one of the bearing support member and the housing bottom portion.

14 Claims, 18 Drawing Sheets

ROTATING ELECTRICAL MACHINE AND METHOD OF MANUFACTURING THE ROTATING ELECTRICAL MACHINE

BACKGROUND OF THE INVENTION

1. Field of the Invention

The present invention relates to a rotating electrical machine used as a drive source and/or an electric generator.

2. Description of the Prior Art

In recent years, highly-efficient motors with high inductance are extensively used along with the improvement of a motor rotation control technology. As one example of such motors, there is available an IPM (Interior Permanent Magnet) type motor in which rotor magnets are held within a rotor core.

SUMMARY OF THE INVENTION

In accordance with one aspect of the present invention, there is provided a method of manufacturing a rotating electrical machine comprising: a) fixing a rotor core to a shaft; b) assembling a stationary assembly in which a first bearing is fixed to a housing bottom portion of a substantially cylindrical housing member having a closed bottom and in which an annular stator is fixed to an inner circumferential surface of a cylinder portion of the housing member; c) inserting the rotor core into the stator while fitting a lower portion of the shaft into the first bearing; d) fitting an upper portion of the shaft into a second bearing supported by a bearing support member; e) fixing the bearing support member to an upper portion of the housing member; and f) axially inserting a plurality of rotor magnets into a plurality of axially-extending hole-shaped or groove-shaped magnet holding portions formed in the rotor core, through a magnet insertion hole defined in one of the bearing support member and the housing bottom portion.

In accordance with another aspect of the present invention, there is provided a rotating electrical machine, comprising: a substantially cylindrical housing member having a closed bottom; a first bearing fixed to a housing bottom portion of the housing member; an annular stator fixed to an inner circumferential surface of a cylinder portion of the housing member; a bearing support member fixed to a top portion of the housing member; a second bearing supported on the bearing support member; a rotor core arranged inside the stator; a shaft to which the rotor core is fixed, the shaft having a portion positioned below the rotor core and supported on the first bearing and a portion positioned above the rotor core and supported on the second bearing; and a plurality of rotor magnets axially inserted into and held by a plurality of axially-extending hole-shaped or groove-shaped magnet holding portions formed in the rotor core, one of the bearing support member and the housing bottom portion having a magnet insertion hole axially overlapping with the entirety of at least one of the magnet holding portions.

According to the present invention, it is possible to assemble a rotating electrical machine with ease and increased accuracy.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
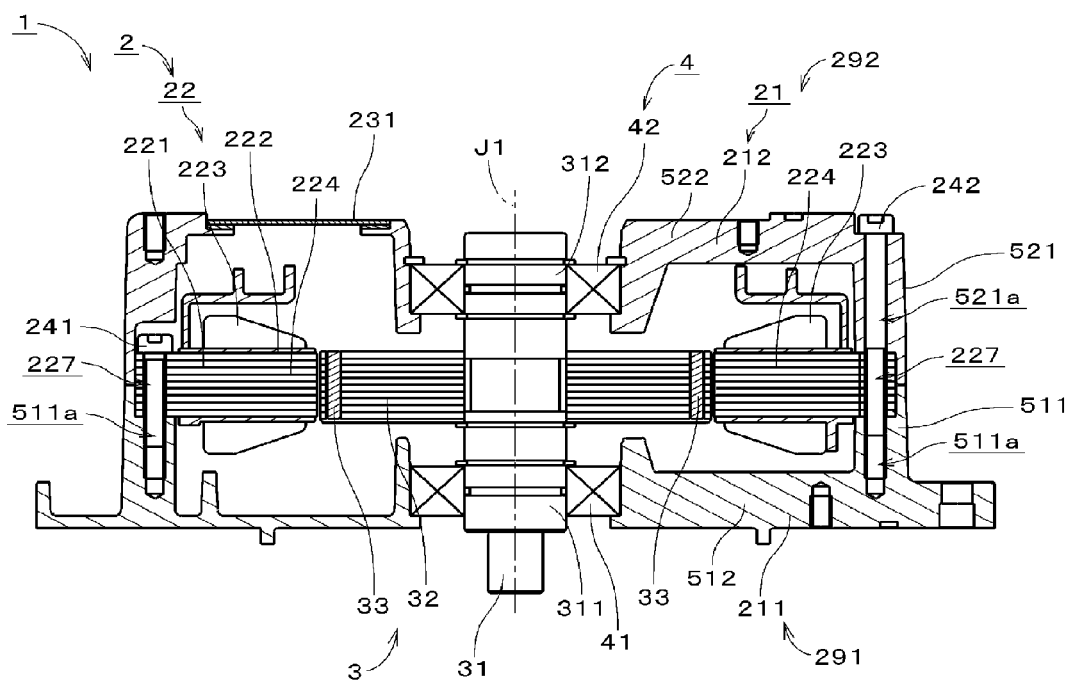
FIG. 1 is a view showing a motor according to a first preferred embodiment of the present invention.

In the subject specification, the upper side in the center axis direction of a motor in FIG. 1 will be just referred to as "upper" and the lower side as "lower". The up-down direction is not intended to designate the positional relationship or the orientation when the motor is mounted to an actual device. The direction parallel to the center axis will be referred to as "axial direction", the direction perpendicular to the center axis will be just referred to as "radial direction", and the direction extending circumferentially about the center axis will be just referred to as "circumferential direction".

First Preferred Embodiment

FIG. 1 is a view showing a motor as a rotating electrical machine in accordance with a first preferred embodiment of the present invention. The motor 1 is of an inner rotor type. The motor 1 preferably includes a stationary unit 2, a rotary unit 3 and a bearing mechanism 4. The bearing mechanism 4 supports the rotary unit 3 to rotate about a center axis J1 of the motor 1 with respect to the stationary unit 2.

The stationary unit 2 preferably includes a housing 21 and a stator 22. The housing 21 preferably includes a substantially cylindrical first housing member 211 having a closed bottom, a substantially cylindrical second housing member 212 having a closed top and a cover member 231. The first housing member 211 preferably includes a first cylinder portion 511 and a first plate portion 512. A plurality of axially-extending hole portions 511a is defined in the first cylinder portion 511. The first plate portion 512 is the bottom portion of the first housing member 211 and extends radially inwards from the lower end portion of the first cylinder portion 511. The second housing member 212 preferably includes a second cylinder portion 521 and a second plate portion 522. A plurality of axially-extending hole portions 521a is defined in the second cylinder portion 521. The second plate portion 522 extends radially inwards from the upper end portion of the second cylinder portion 521.

Figure 2:
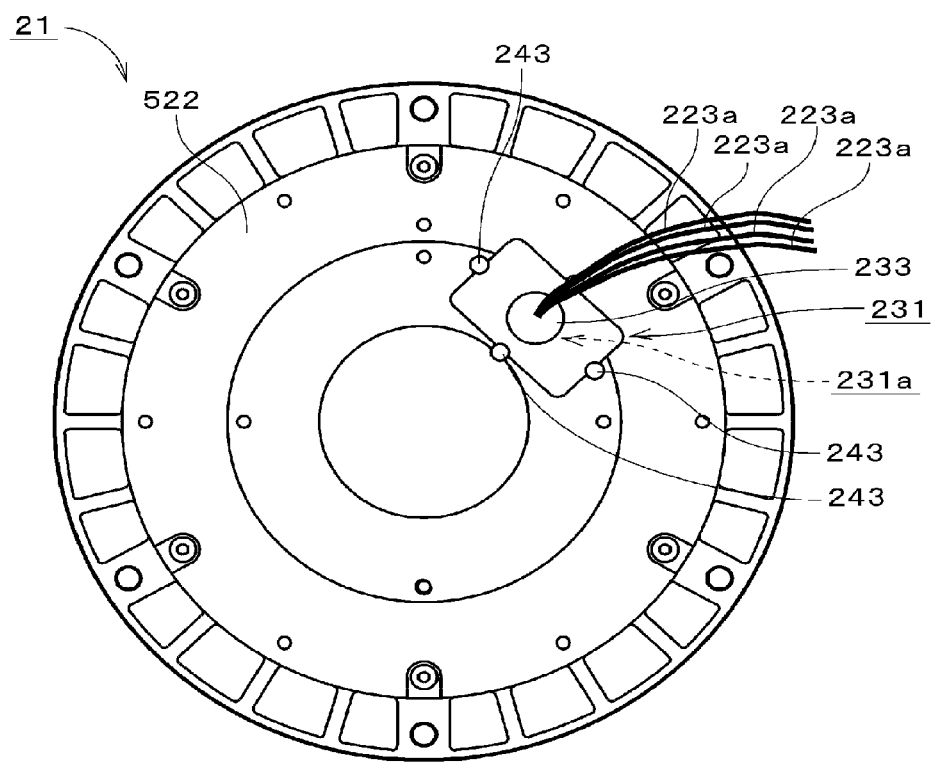
FIG. 2 is a plan view of the motor.
Figure 3:
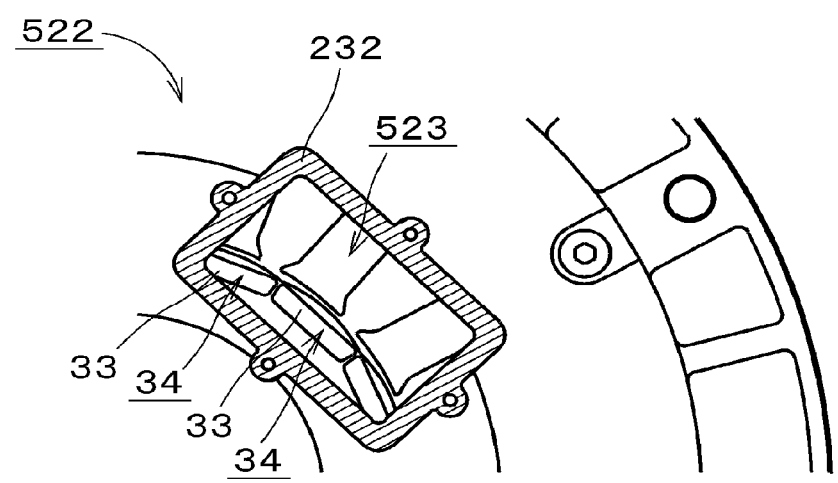
FIG. 3 is a view illustrating a magnet insertion hole.

FIG. 2 is a plan view of the housing 21. The cover member 231 has a substantially rectangular shape and is attached to the second plate portion 522 by screws 243. An opening 231a is defined in the central area of the cover member 231. A resin-made bush 233 is inserted into the opening 231a. FIG. 3 is a view showing a portion of the second plate portion 522 with the cover member 231 removed. The second plate portion 522 has a substantially rectangular through-hole 523. A ring-shaped seal member 232 is arranged around the through-hole 523. The seal member 232 is hatched in FIG. 3. The seal member 232 is made of a resin. In the motor 1, the cover member 231 is attached to the through-hole 523 with the seal member 232 interposed therebetween.

Figure 4:
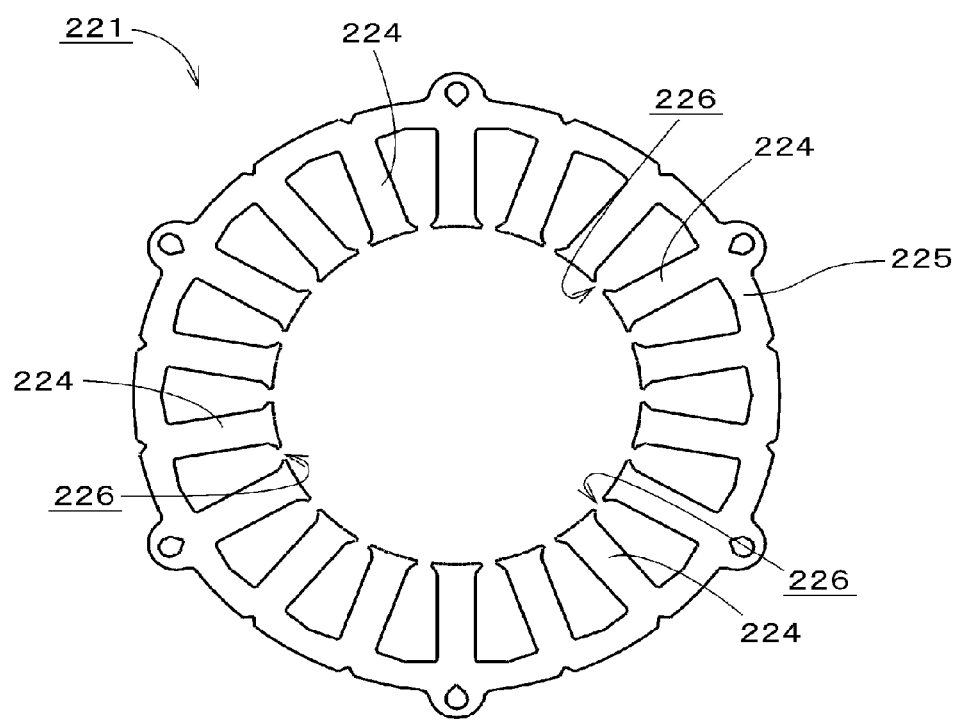
FIG. 4 is a plan view of a stator core.

As shown in FIG. 1, the stator 22 is formed into an annular shape about the center axis J1. The stator 22 preferably includes a stator core 221, an insulator 222 and coils 223. The stator core 221 is formed by laminating a plurality of thin magnetic steel plates one above another. FIG. 4 is a plan view of the stator core 221. The stator core 221 preferably includes eighteen teeth 224 and an annular core back 225. Each layer of the laminated steel plates making up the stator core 221 is a single metal plate continuously extending in the circumferential direction. The teeth 224 are arranged at a regular pitch in the circumferential direction and extend radially inwards from the core back 225 toward a rotor core 32. The number of slot gaps 226 (hereinafter referred to as "slot number") defined between the teeth 224 is eighteen. Each layer of the laminated steel plates making up the stator core 221 may be a plurality of metal plates split in the circumferential direction.

As shown in FIG. 1, the surface of the stator core 221 is covered with the insulator 222 as an insulating body. In the stator 22, the coils 223 of U, V and W phases are formed by winding conductor wires on the respective teeth 224 through the insulator 222. As can be seen in FIG. 2, lead lines 223a connected to the coils 223 of the respective phases are drawn to the outside of the second plate portion 522 through the bush 233. One of the lead lines 223a shown in FIG. 2 is control-purpose lead line. The bush 233 is fixed to the lead lines 223a by injection molding or other fixing methods. The fixing point of the lead lines 223a in the bush 233 is sealed.

As shown in FIG. 1, a plurality of attachment holes 227 is arranged in the stator core 221 along the circumferential direction. The left attachment holes 227 in FIG. 1 axially overlap with the corresponding hole portions 511a of the first cylinder portion 511. Screws 241 are fitted into the left attachment holes 227 and the hole portions 511a to thereby fix the stator core 221 and the first cylinder portion 511 together. The right attachment holes 227 in FIG. 1 axially overlap with the corresponding hole portions 511a of the first cylinder portion 511 and the corresponding hole portions 521a of the second cylinder portion 521. Screws 241 are fitted into the right attachment holes 227 and the hole portions 511a and 521a to thereby fix the first cylinder portion 511, the second cylinder portion 521 and the stator core 221 together. By the screw-fixing stated above, the stator 22 is fixed to the inner circumferential surfaces of the first cylinder portion 511 and the second cylinder portion 521. The outer circumferential surface of the stator core 221 is snugly press-fitted to the inner circumferential surfaces of the first cylinder portion 511 and the second cylinder portion 521. The second housing member 212 is fixed to the upper portion of the first housing member 211 by the screws 242.

The rotary unit 3 preferably includes a shaft 31, the rotor core 32 and a plurality of rotor magnets 33. The shaft 31 is arranged in a coaxial relationship with the center axis J1. The rotor core 32 has a substantially cylindrical shape and is fixed to the outer circumference of the shaft 31. A neodymium magnet is used as the rotor core 32. The rotor core 32 is arranged radially inwards of the stator 22. The outer circumferential surface of the rotor core 32 adjoins to the inner circumferential surface of the stator 22. Thus, the inductance of the motor 1 grows higher. In the motor 1, large torque is generated between the rotor core 32 and the stator 22.

Figure 5:
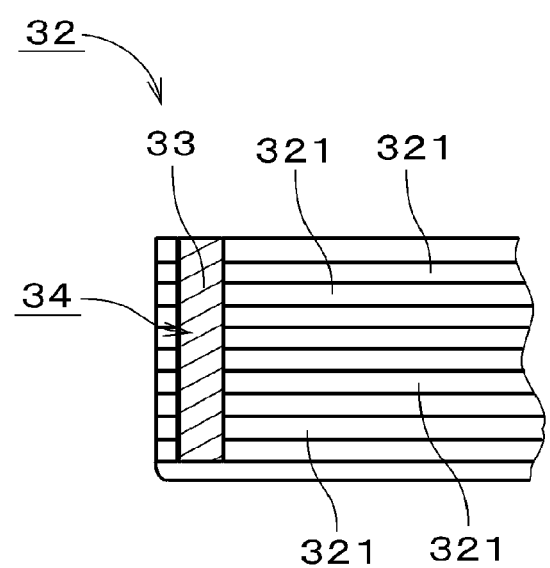
FIG. 5 is a section view showing a rotor core and a rotor magnet.

FIG. 5 is a section view showing the outer edge portion of the rotor core 32 on an enlarged scale. The rotor core 32 is formed by laminating a plurality of thin magnetic steel plates 321 one above another. A plurality of magnet holding portions 34 as axially-extending hole portions is defined in the outer edge portion of the rotor core 32. The magnet holding portions 34 extend from the upper end of the rotor core 32 to near the lower end thereof. The rotor magnets 33 are held within the magnet holding portions 34. As such, the motor 1 is an IPM (Interior Permanent Magnet) type motor in which the rotor magnets 33 are held within the rotor core 32. Since the motor 1 is of the IPM type, it is possible to increase the magnetic flux density of the rotor magnets 33, consequently making the inductance greater. It is also possible to reliably prevent the rotor magnets 33 from falling down.

In the rotor core 32, the magnet holding portions 34 are defined by overlapping the hole portions formed in the outer edge portions of the magnetic steel plates 321 through a punching process. However, no hole portion is formed in the lowermost magnetic steel plate 321 of the rotor core 32, whereby the lower ends of the magnet holding portions 34 are closed by the lowermost magnetic steel plate 321.

Figure 6:
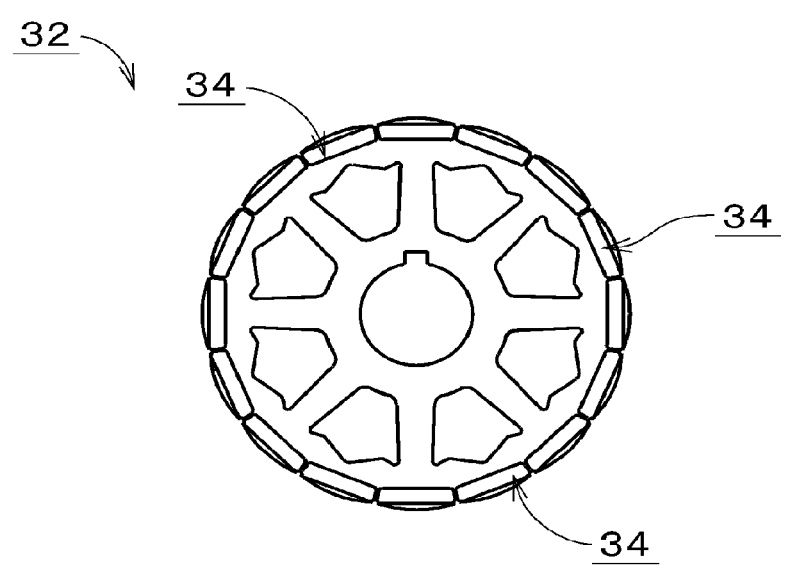
FIG. 6 is a plan view of the rotor core.

FIG. 6 is a plan view of the rotor core 32. As shown in FIG. 6, the magnet holding portions 34 are provided in an adjoining relationship with one another along the circumferential direction. The number of the magnet holding portions 34, namely the number of the holding positions of the rotor magnets 33 in the circumferential direction, is sixteen. In the following description, the number of magnetic poles on the outer circumferential surface of the rotary unit 3 will be referred to as "pole number".

As shown in FIG. 3, the through-hole 523 of the second plate portion 522 is greater in size than one of the magnet holding portions 34 when seen in a plan view. The through-hole 523 axially overlaps with one of the magnet holding portions 34. As will be set forth below, the rotor magnets 33 are inserted into the magnet holding portions 34 through the through-hole 523. The through-hole 523 will be hereinafter referred to as "magnet insertion hole 523".

As shown in FIG. 1, the bearing mechanism 4 preferably includes a first bearing 41 and a second bearing 42. The first bearing 41 and the second bearing 42 are ball bearings. The first bearing 41 is fixed to the inner circumferential surface of a hole portion defined at the center of the first plate portion 512. The second bearing 42 is fixed to the inner circumferential surface of a hole portion defined at the center of the second plate portion 522. The first bearing 41 supports the lower portion of the shaft 31 below the rotor core 32. The second bearing 42 supports the upper portion of the shaft 31 above the rotor core 32. When the motor is driven, the shaft 31 is rotatably supported by the first bearing 41 and the second bearing 42.

Next, description will be made on the configuration for reducing the cogging torque in the motor 1. In the following description, the cogging torque generated when no measure is taken against the cogging torque will be referred to as "basic cogging torque".

Figure 7:
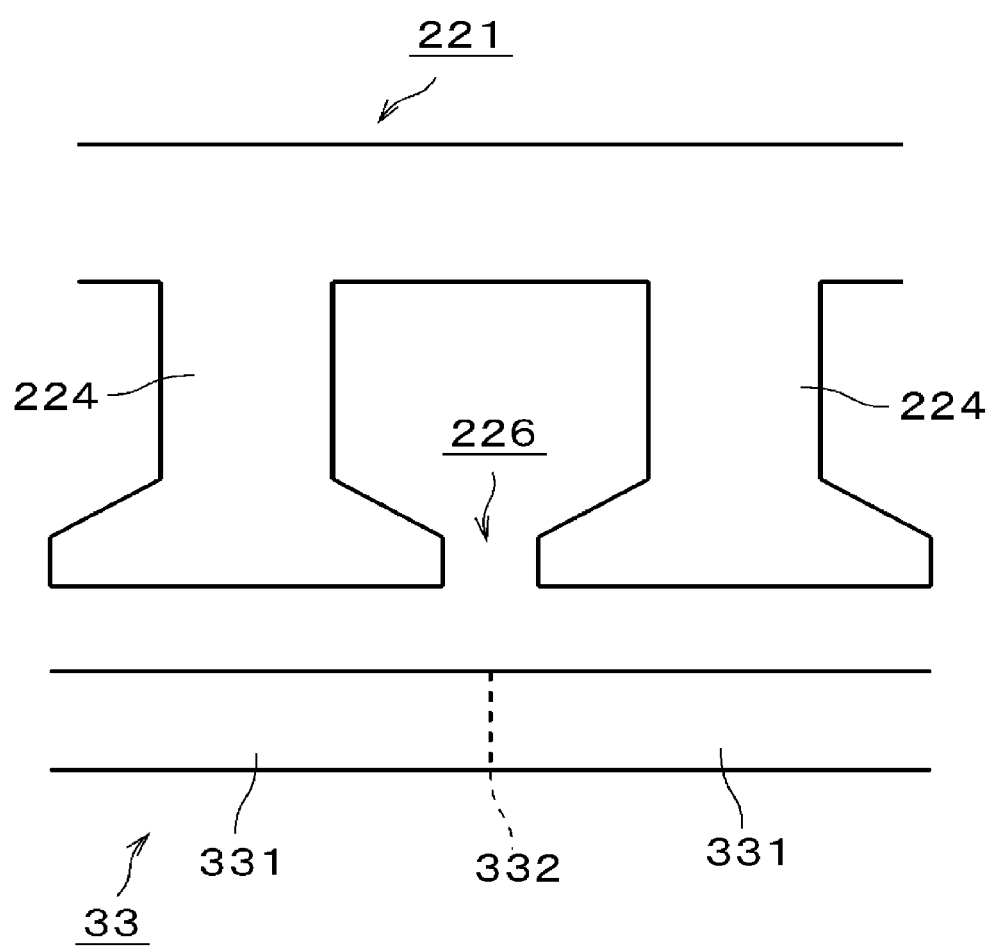
FIG. 7 is a view showing teeth and magnetic poles.

FIG. 7 is a view illustrating a pair of teeth 224 and magnetic poles 331. The left-right direction in FIG. 7 corresponds to the circumferential direction. The boundary 332 between the magnetic poles 331 and 331 is exactly aligned with one of the slot gaps 226. In the motor 1, depending on the design of the stator core 221, it is sometimes the case that, if the rotor magnets 33 are moved a little bit from the afore-mentioned state, a force tending to return the rotor magnets 33 to the original positions (hereinafter referred to as "centripetal force") may act on the rotor magnets 33. It is also sometimes the case that, if the rotor magnets 33 are moved a little bit, a force tending to move the rotor magnets 33 in the moving direction (hereinafter referred to as "expulsive force") may act on the rotor magnets 33. The waveform of the basic cogging torque in case of generation of the centripetal force is in opposite phase to the waveform of the basic cogging torque in case of generation of the expulsive force. In the motor 1, as will be described later, the basic cogging torque is reduced by forming a plurality of fine protrusions in the tip ends of the teeth 224.

Figure 8:
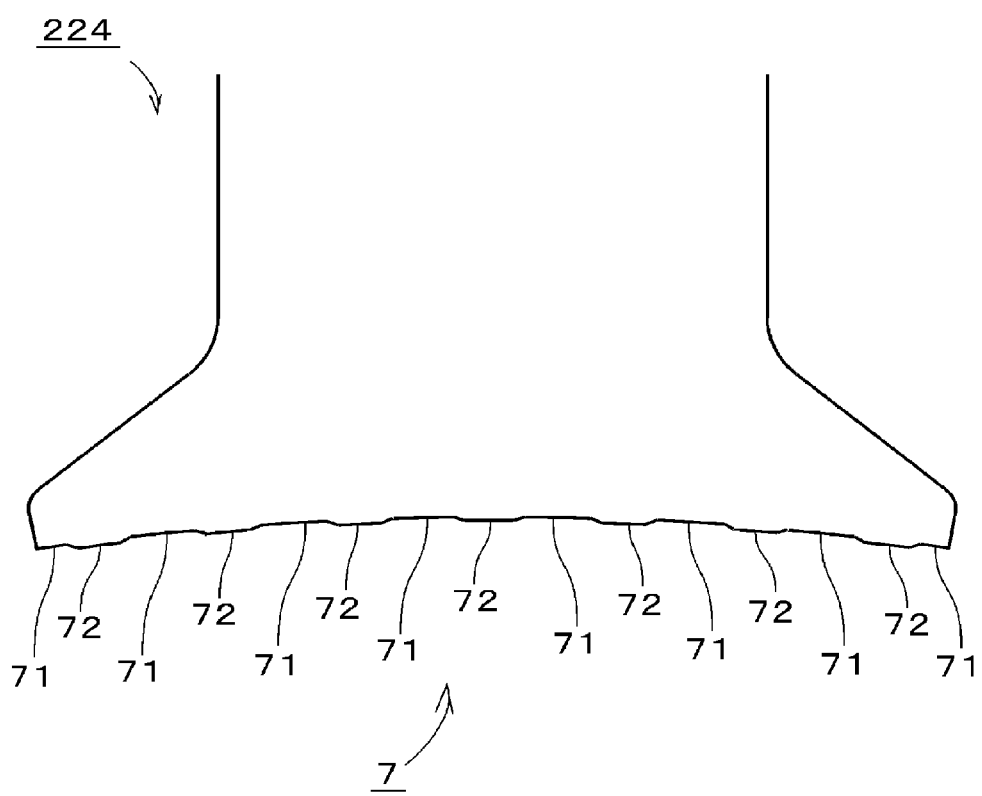
FIG. 8 is a view showing a tip end portion of one of the teeth.

FIG. 8 is a view showing the arrangement of the protrusions for reducing the basic cogging torque in case where the centripetal force is generated in the state illustrated in FIG. 7. Each of the teeth 224 includes a tip end surface 7 having reference tip end surfaces 71 and seven protrusions 72. The protrusions 72 are quite small in height. The reference tip end surfaces 71 are positioned between the protrusions 72 and in the outermost areas of the tip end surface 7. The reference tip end surfaces 71 have a partially cylindrical surface shape. The protrusions 72 protrude toward each of the rotor magnets 33 from the reference tip end surfaces 71. The protrusions 72 are positioned to equally divide the area between the centers of the slot gaps 226 existing at the opposite sides of each of the teeth 224. The protrusions 72 have a pitch angle of, e.g., 2.5 (=360/144) degrees. The sections between the protrusions 72 may be regarded as grooves.

Figure 9:
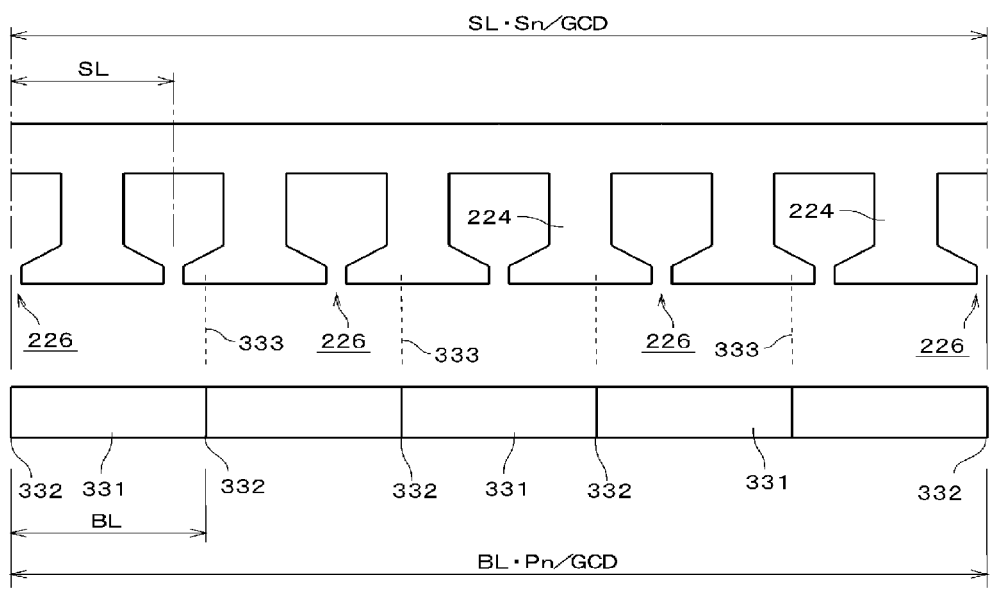
FIG. 9 is a view showing the teeth and the magnetic poles.

FIG. 9 is an extracted view showing the teeth 224 and the rotor magnets 33 arranged between one alignment position where one of the slot gaps 226 of the stator 22 is aligned with one of the boundaries 332 of the magnetic poles 331 of the rotor magnets 33 and the next alignment position. The left-right direction in FIG. 9 corresponds to the circumferential direction. If the rightmost slot gap 226 and the rightmost boundary 332 are excluded from counting, the number of the slot gaps 226 (=(slot number Sn)/(greatest common divisor CCD)) and the number of the boundaries 332 (=(pole number Pn)/(greatest common divisor GCD)) are mutually prime as a matter of course.

Assuming that the distance between the adjoining slot gaps 226 is SL and the distance between the adjoining boundaries 332 is BL, there is completed an equation (SL·Sn/GCD)=(BL·Pn/GCD) because the upper portion and the lower portion in FIG. 9 are equal in length with each other. Therefore, the distance from the center of the leftmost slot gap 226 to the respective boundaries 332 is the integral multiples of SL·Sn/Pn, the integral multiples ranging from one times to (Pn−1) times. This distance as represented by respective dotted line is the distance from the center of the leftmost slot gap 226 to one of the positions (hereinafter referred to as "equally divided positions") defined by equally dividing the distance between the left most and right most slot gaps 226 into (Pn/GCD) in the tip end of each of the teeth 224.

Since Sn/GCD and Pn/GCD are mutually prime, the equally divided positions differing from one another appear only once throughout the left-right distance (SL×Sn/GCD) in FIG. 9. If the boundaries 332 of the magnetic poles 331 are moved from the left side to the right side in this state, one of the slot gaps 226 and one of the boundaries 332 are exactly aligned with each other in the tip ends of the respective teeth 224 at the time when the boundaries 332 are positioned in the equally divided positions.

Further, since the LCM (least common multiple) of the slot number Sn and the pole number Pn is (Sn×Pn/GCD), (Pn/GCD) is equal to (LCM/Sn). The number of the positions equally dividing SL into (LCM/Sn) in the tip ends of the teeth 224 is equal to (LCM/Sn−1) which is obtained by subtracting 1 from the quotient of the least common multiple LCM of the slot number Sn and the pole number Pn divided by the slot number Sn. Even if the centripetal force is generated in the state illustrated in FIG. 7, the total cogging torque can be reduced by arranging the protrusions 72 in the positions stated above.

In other words, if the number of the protrusions 72 which can be arranged in each of the teeth 224, (LCM/Sn−1), is assumed to be the maximum protrusion arrangement number, the positions defined by equally dividing the distance between the adjoining slot gap 226 of each of the teeth 224 by the maximum protrusion arrangement number plus 1, (LCM/Sn), become the suitable protrusion arrangement positions where the protrusions 72 can be arranged. The positions thus defined are all of the suitable protrusion arrangement positions.

The wave number of the basic cogging torque generated when the rotor magnets 33 are rotated once is represented by Sn×Pn/GCD=LCM. Therefore, the mechanical angle between the peaks of the basic cogging torque is equal to the mechanical angle between the suitable protrusion arrangement positions. By providing the protrusions 72 in all the suitable protrusion arrangement positions, it is possible to offset all the peaks of the basic cogging torque and to reduce the total cogging torque.

It is not always necessary that the protrusions 72 be provided in all the suitable protrusion arrangement positions in order to reduce the total cogging torque. If the protrusions 72 are arranged in a random pattern, however, there is a possibility that the cogging torque reduction effect provided by the protrusions 72 may not be attainable at the time when one of the slot gaps 226 and one of the boundaries 332 are exactly aligned with each other. As shown in FIG. 9, the suitable protrusion arrangement positions appear only once in (SL·Sn/GCD). Thus, the peaks of the basic cogging torque can be equally reduced by providing the protrusions 72 in the same positions of the respective teeth 224. In other words, it is preferable to provide at least one protrusion 72 in at least one predetermined suitable protrusion arrangement position.

More preferably, a plurality of protrusions 72 is provided in each of the teeth 224. In view of the balance of the forces acting on the respective teeth 224, it is preferred that at least one protrusion 72 be symmetrically arranged with respect to the symmetry axis of each of the teeth 224. Depending on the design, it is sometimes the case that the pure tone during the drive can be reduced by asymmetrically arranging the protrusion 72 with respect to the symmetry axis of each of the teeth 224. In this case, the position of said at least one protrusion 72 includes the position deviated from the center of the tip end surface 7 in the circumferential direction.

Figure 10:
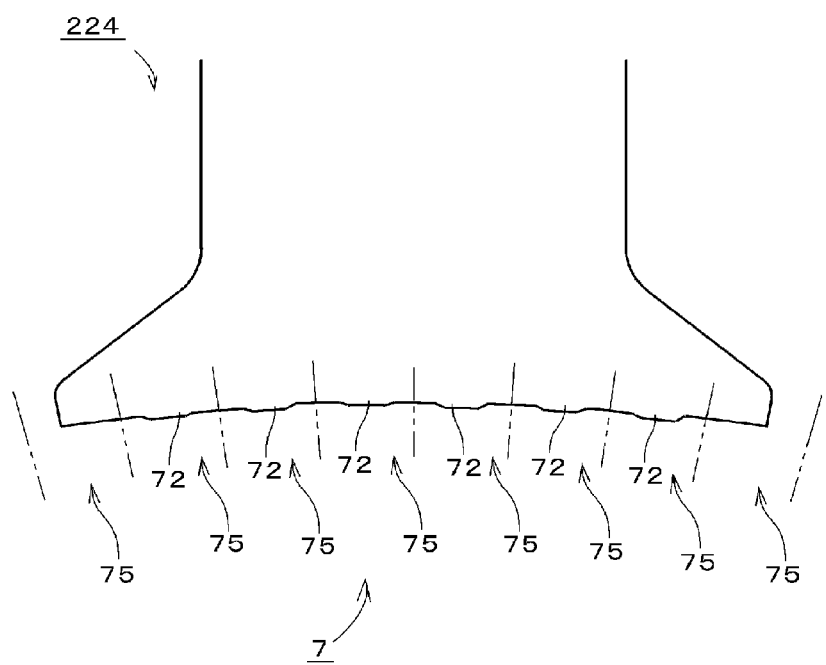
FIG. 10 is a view illustrating another example of one of the teeth.

Next, description will be given on the arrangement of the protrusions for reducing the basic cogging torque in case where an expulsive force is generated in the state illustrated in FIG. 7. As described earlier, the waveform of the basic cogging torque generated by the expulsive force is in opposite phase to the waveform of the basic cogging torque generated by the centripetal force. In order to reduce the basic cogging torque in this case, the suitable protrusion arrangement position becomes the center position between the adjoining protrusions 72 shown in FIG. 8. In other words, as shown in FIG. 10, the protrusions 72 are arranged at the centers of six regions 75 other than the opposite end regions 75 among eight regions 75 which are defined by equally dividing the distance between the slot gaps 226 positioned at the opposite sides of each of the teeth 224.

The protrusions 72 may be arranged even in the opposite end regions 75 if the circumferential width of the tip end surface 7 of each of the teeth 224 is large and if the overlapping dimension between the opposite end regions 75 and the tip end surface 7 is sufficiently great. In the motor 1, the maximum protrusion arrangement number in each of the teeth 224 is the quotient of the least common multiple of the slot number and the pole number divided by the slot number. The respective protrusions 72 are arranged in the circumferential center positions of plural regions defined by equally dividing the distance between the slot gaps 226 positioned at the opposite sides of each of the teeth 224 into the same number as the maximum protrusion arrangement number in the circumferential direction. These positions are the suitable protrusion arrangement positions. It is not always necessary that the protrusions 72 be provided in all the suitable protrusion arrangement positions in order to reduce the cogging torque. With a view to reliably reduce the cogging torque, it is however preferable to provide at least one protrusion 72 in at least one predetermined suitable protrusion arrangement position.

As in FIG. 8, it is more preferable to provide a plurality of protrusions 72 in each of the teeth 224. In view of the balance of the forces acting on the respective teeth 224, it is preferred that at least one protrusion 72 be symmetrically arranged with respect to the symmetry axis of each of the teeth 224. Depending on the design, it is sometimes the case that the pure tone during the drive can be reduced by asymmetrically arranging the protrusion 72 with respect to the symmetry axis of each of the teeth 224.

Figure 11:
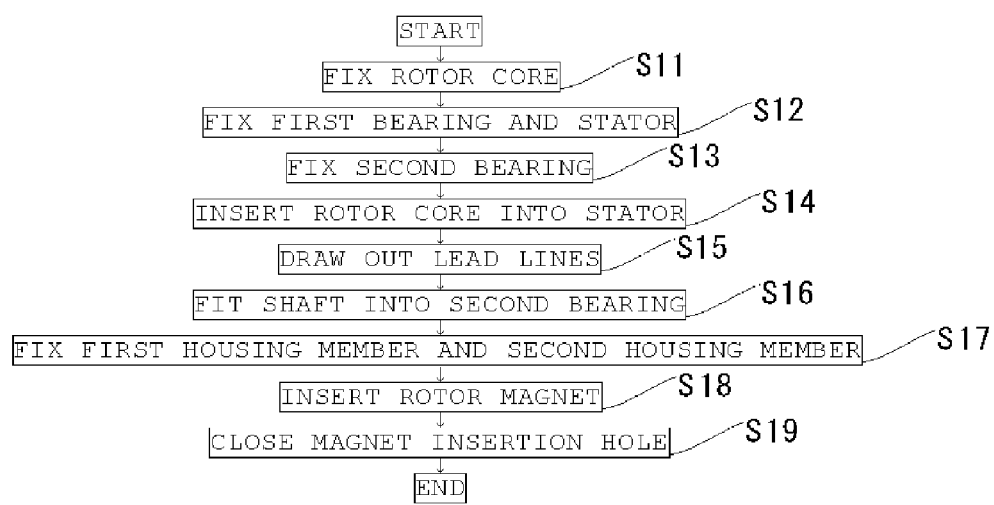
FIG. 11 is a view illustrating an assembling flow of the motor.

Next, the assembling flow of the motor 1 will be described with reference to FIG. 11. First, the rotor core 32 shown in FIG. 1 is fixed to the outer circumferential surface of the shaft 31 (step S11). Then, the first bearing 41 is fixed to the central portion of the first plate portion 512 of the first housing member 211. The stator 22 is snugly press-fitted to the inner circumferential surface of the first cylinder portion 511. Then, the screws 241 are fitted into the attachment holes 227 of the stator 22 and the hole portions 511a of the first housing member 211, thereby fixing the stator 22 and the first cylinder portion 511 together (step S12). The assembly of the first housing member 211, the first bearing 41 and the stator 22 will be hereinafter referred to as "stationary assembly 291". In the second housing member 212, the second bearing 42 is fixed to the centeral portion of the second plate portion 522 (step S13). The assembly of the second housing member 212 and the second bearing 42 will be hereinafter referred to as "upper assembly 292". In assembling the motor 1, step S12 may be performed prior to step S11. Step S13 may be carried out prior to steps S11 and S12. Steps S11 through S13 may be performed in parallel.

Figure 12:
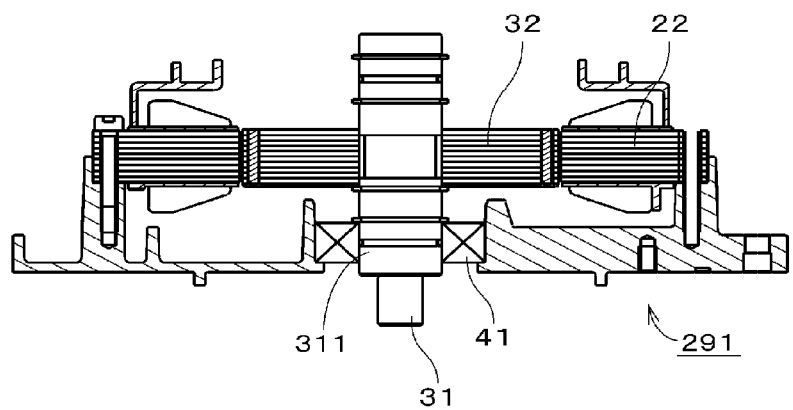
FIG. 12 is a view showing the motor under an assembling process.
Figure 13:
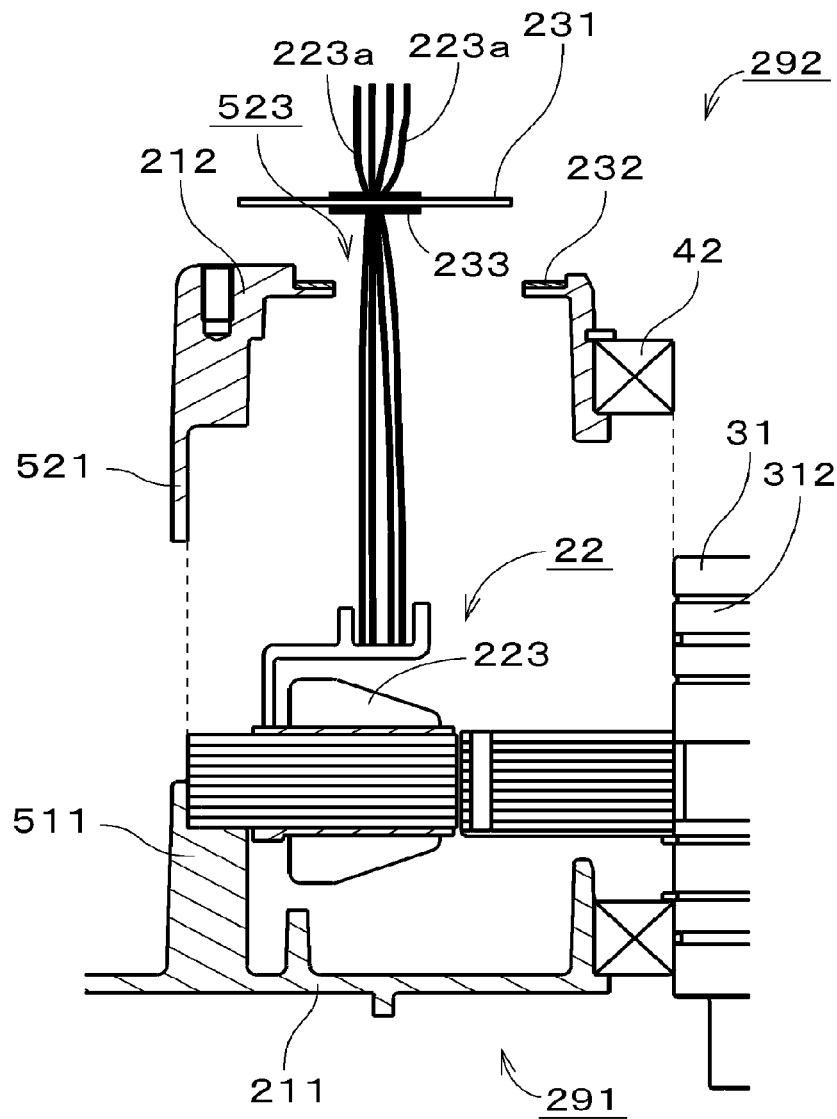
FIG. 13 is a view showing the motor under an assembling process.

Next, as shown in FIG. 12, the rotor core 32 is inserted into the stator 22 of the stationary assembly 291 (step S14). At this time, the lower portion 311 of the shaft 31 is inserted into the first bearing 41. FIG. 13 is a view showing the motor 1 under an assembling process. The seal member 232 is arranged around the magnet insertion hole 523 of the second housing member 212. In the stator 22, the lead lines 223a drawn from the coils 223 extend through the cover member 231 together with the bush 233. The cover member 231 and the lead lines 223a are drawn through the magnet insertion hole 523 to the upper side of the second housing member 212 (step S15). The cover member 231, when inserted through the magnet insertion hole 523, is tilted such that the normal line of the major surface of the cover member 231 is oriented substantially in the horizontal direction. In the motor 1, the use of the magnet insertion hole 523 eliminates the need to additionally provide a hole through which the lead lines 223a are to be drawn out.

Thereafter, the upper portion 312 of the shaft is fitted into the second bearing 42 supported on the second housing member 212 (step S16). The first cylinder portion 511 of the first housing member 211 and the second cylinder portion 521 of the second housing member 212 make contact with each other in the axial direction. As shown in FIG. 1, the screws 242 are inserted into the hole portions 511a and 521a of the first and second cylinder portions 511 and 521 and the attachment holes 227 of the stator 22. Thus, the first housing member 211 is fixed to the first cylinder portion 511 (step S17), thereby fixing the stationary assembly 291 and the upper assembly 292 together.

Figure 14:
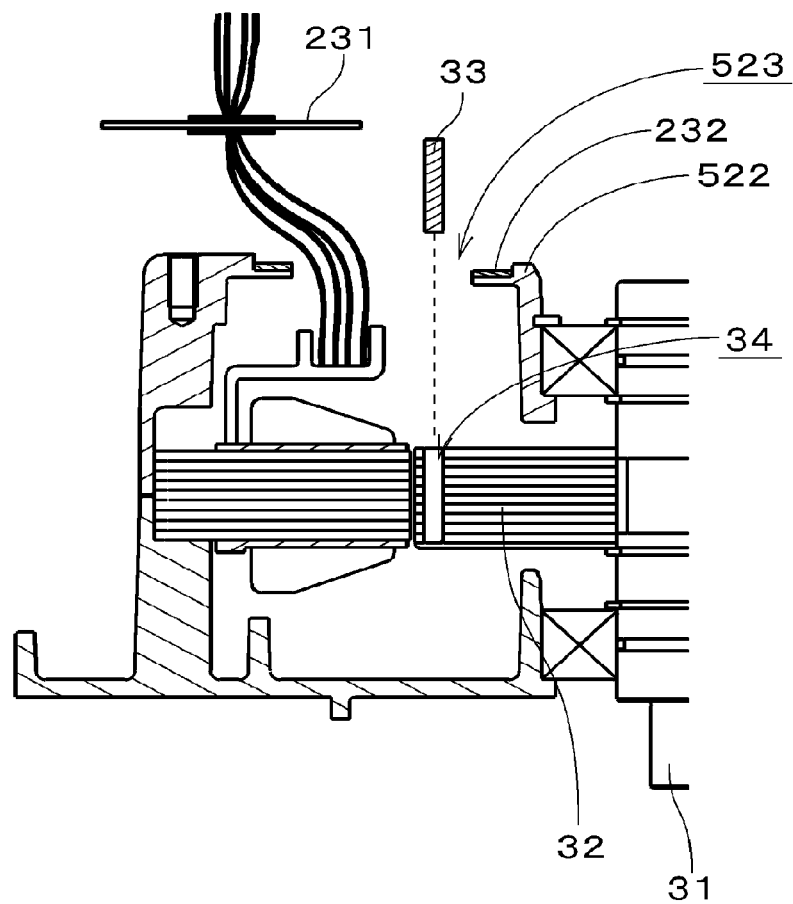
FIG. 14 is a view showing the motor under an assembling process.

Next, as shown in FIG. 14, the shaft 31 is rotated if necessary so that the magnet holding portion 34 of the rotor core 32 and the magnet insertion hole 523 of the second plate portion 522 can aligned with each other in the axial direction. Then, the rotor magnet 33 is axially inserted into the magnet holding portion 34 through the magnet insertion hole 523. An adhesive agent is applied on the magnet holding portion 34 in advance. The rotor magnet 33 is fixed in place by the adhesive agent and the magnetic attraction force of the rotor core 32. Since the lower portion of the magnet holding portion 34 is not opened, the rotor magnet 33 can be axially positioned with ease. It is also possible to prevent the rotor magnet 33 from moving downwards.

The shaft 31 is rotated at a specified angle so that the empty magnet holding portion 34 can be axially aligned with the magnet insertion hole 523. Another rotor magnet 33 is inserted into the magnet holding portion 34 through the magnet insertion hole 523. In assembling the motor 1, the task of inserting the rotor magnet 33 into the magnet holding portion 34 is repeatedly performed while rotating the shaft 31.

After the rotor magnets 33 are inserted into all the magnet holding portions 34 (step S18), the cover member 231 is attached to the area around the through-hole 523 with the seal member 232 and the edge portion of the cover member 231 overlapping with each other, thereby closing the magnet insertion hole 523 (step S19).

While the structure and the assembling method of the motor 1 have been described hereinabove, the rotor core 32 is tilted by the strong magnetic interaction between the rotor magnets 33 and the stator 22 if one attempts to insert the rotor core 32 into the stator 22 in a state that the rotor magnets 33 are fixed to the magnet holding portions 34. If the shaft 31 is inserted into the first bearing 41 in this state, the first bearing 41 gets distorted. As a result, the coaxiality of the shaft 31 with respect to the housing 21 is impaired and the rotary unit 3 is severely vibrated when the motor 1 is in operation. In assembling the present motor 1, however, the rotor magnets 33 are inserted into the magnet holding portions 34 after the shaft 31 and the rotor core 32 are supported on the second housing member 212 and the first housing member 211. Thus, the shaft 31 and the rotor core 32 can be accurately supported with respect to the housing 21. As a consequence, it is possible to easily and accurately assemble the motor 1.

It is also possible to reduce the intensity and frequency at which the outer circumferential surface of the rotor core 32 makes contact with the inner circumferential surface of the stator core 221 when the rotor core 32 is inserted into the stator 22. This makes it possible to prevent occurrence of damage and generation of burrs in the protrusions 72 provided in the teeth 224 of the stator core 221. As a result, it is possible to maintain the quality of the motor 1 with the basic cogging torque kept low.

When inserting the rotor core 32, no magnetic interaction is generated between the rotor core 32 and the stator 22. Therefore, there is no need to use large-scale equipment to fix the position of the rotor core 32 in the direction perpendicular to the center axis J1. In a hypothetical case that the position of the rotor core 32 is firmly fixed in the direction perpendicular to the center axis J1, it becomes impossible to finely adjust the position of the rotor core 32 with respect to the stator 22. Thus, a so-called scrape by which one of the rotor core 32 and the stator 22 cuts the other is generated due to the error in the holding position of equipment or the error in the shape of the rotor core 32 and the stator 22, consequently generating burrs in the rotor core 32 and the stator 22. In the present motor 1, there is no need to firmly fix the rotor core 32 and the stator 22. Accordingly, it is possible to prevent occurrence of poor assembling otherwise caused by the scrape and to reduce the equipment costs.

In the second housing member 212, the cover member 231 closes the magnet insertion hole 523 through the seal member 232. It is therefore possible to prevent water or other foreign materials from infiltrating into the housing 21 from a minute clearance between the cover member 231 and the second plate portion 522 through the magnet insertion hole 523. In case where the second housing member 212 is less likely to be wetted by water or the like, a cutout may be formed in the bush 233 so that the lead lines 223a can be drawn out through the cutout.

Second Preferred Embodiment

Figure 15:
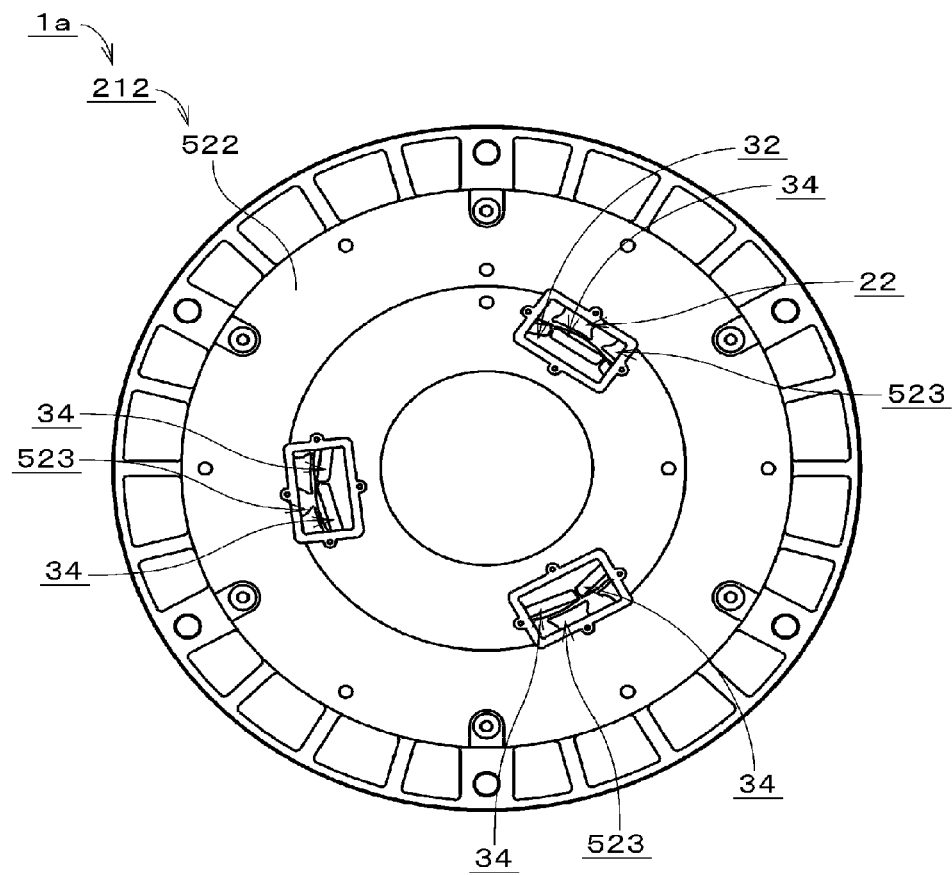
FIG. 15 is a plan view showing a motor according to a second preferred embodiment.

FIG. 15 is a plan view of a motor 1a in accordance with a second preferred embodiment. In the motor 1a, a plurality of magnet insertion holes 523 is defined in the second plate portion 522 of the second housing member 212. In reality, as in FIG. 3, the seal member 232 is arranged around each of the magnet insertion holes 523. The magnet insertion holes 523 are closed by the same cover members 231 as shown in FIG. 2. The lead lines 223a are drawn out from one of the cover members 231. The opening for insertion of a bush is not provided in the remaining cover members 231. Other configurations of the motor 1a remain the same as those of the first preferred embodiment. In the following description, the same components will be designated by like reference symbols. The magnet insertion holes 523 are arranged in the circumferential direction. When seen in a plan view, each of the magnet insertion holes 523 is greater than one of the magnet holding portions 34. Each of the magnet insertion holes 523 can axially overlapped with the entirety of one of the magnet holding portions 34.

The assembling process of the motor 1a is the same as the that of the motor 1 except the task of inserting the rotor magnets 33 into the magnet holding portions 34. In the task of inserting the rotor magnets 33, one arbitrary magnet insertion hole 523 is selected and one of the rotor magnets 33 is inserted into the magnet holding portion 34 axially overlapping with the magnet insertion hole 523. In the following description, the magnet insertion hole 523 distinguished from the remaining magnet insertion holes 523 will be referred to as "relevant magnet insertion hole 523".

If the rotor magnet 33 is inserted into the relevant magnet insertion hole 523, it is sometimes the case that the position of the magnet holding portion 34 gets out of alignment with the relevant magnet insertion hole 523 due to the magnetic interaction between the rotor magnet 33 and the stator 22. In the motor 1a, even if one magnet holding portion 34 is deviated from a desired position, another magnet insertion hole 523 axially overlaps with the entirety of another magnet holding portion 34. Thus, the rotor magnet 33 can be inserted into another magnet holding portion 34. In the motor 1a, therefore, the rotor magnets are inserted into all the magnet holding portions 34 through one of magnet insertion holes 523. Accordingly, the rotor magnets 33 can be inserted with ease while rotating the rotor core 32.

In the motor 1a, if each of the magnet insertion holes 523 axially overlaps with the entirety of one of the magnet holding portions 34 at the same time, the rotor magnets 33 may be almost simultaneously inserted into the magnet holding portions 34. This makes it possible to perform the insertion task of the rotor magnets 33 within a shortened period of time.

In the second preferred embodiment, the rotor magnets 33 are inserted into the magnet holding portions 34 after the shaft 31 and the rotor core 32 are supported on the housing 21. Therefore, the shaft 31 and the rotor core 32 can be accurately supported with respect to the housing 21. As a result, it is possible to easily and accurately assemble the motor 1a.

Third Preferred Embodiment

Figure 16:
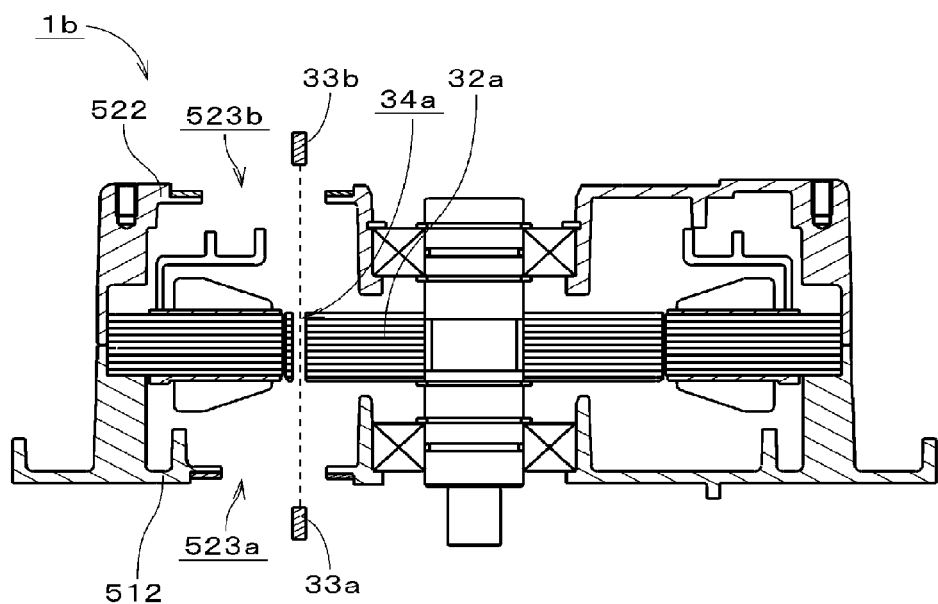
FIG. 16 is a view showing a motor according to a third preferred embodiment.

FIG. 16 is a section view of a motor 1b in accordance with a third preferred embodiment. The rotor core 32a of the motor 1b is provided with an axially-extending hole-shaped magnet holding portion 34a. In the motor 1b, the same magnet insertion hole 523 as shown in FIG. 3 (designated by "523b" in FIG. 16) is provided in the second plate portion 522. Another magnet insertion hole 523 (designated by "523a" in FIG. 16) is provided in the second plate portion 522 in such a position as to axially overlap with the magnet insertion hole 523b. In the following description, the magnet insertion hole 523a will be referred to as "first magnet insertion hole 523a" while the magnet insertion hole 523b will be referred to as "second magnet insertion hole 523b".

In the motor 1b, two rotor magnets each having a length equal to one half of the axial length of the magnet holding portion 34a are arranged in the upper and lower sections of the magnet holding portion 34a. In the following description, the rotor magnet arranged in the lower section of the magnet holding portion 34a will be referred to as "lower magnet 33a" while the rotor magnet arranged in the upper section of the magnet holding portion 34a will be referred to as "upper magnet 33b". Other structures of the motor 1b remain the same as those of the first preferred embodiment.

In the insertion task of the rotor magnets, the lower magnet 33a is first axially inserted through the first magnet insertion hole 523a into the lower section of the magnet holding portion 34a axially overlapping with the first magnet insertion hole 523a. Then, the upper magnet 33b is inserted through the second magnet insertion hole 523b into the upper section of the magnet holding portion 34a. Alternatively, the upper magnet 33b may be inserted into the magnet holding portion 34a prior to inserting the lower magnet 33a. The upper magnet 33b and the lower magnet 33a are fixed in place by the adhesive agent applied within the magnet holding portion 34a and by the magnetic attraction force acting between themselves and the rotor core 32. Other steps of assembling the motor 1b remain the same as those of the first preferred embodiment.

In the third preferred embodiment, the magnet holding portion 34a is formed to extend from the upper end of the rotor core 32 to the lower end thereof. This makes it possible to efficiently insert the rotor magnets even when a plurality of rotor magnets is arranged in a single magnet holding portion 34a. As in the first preferred embodiment, it is also possible to easily and accurately assemble the motor 1b.

Fourth Preferred Embodiment

Figure 17:
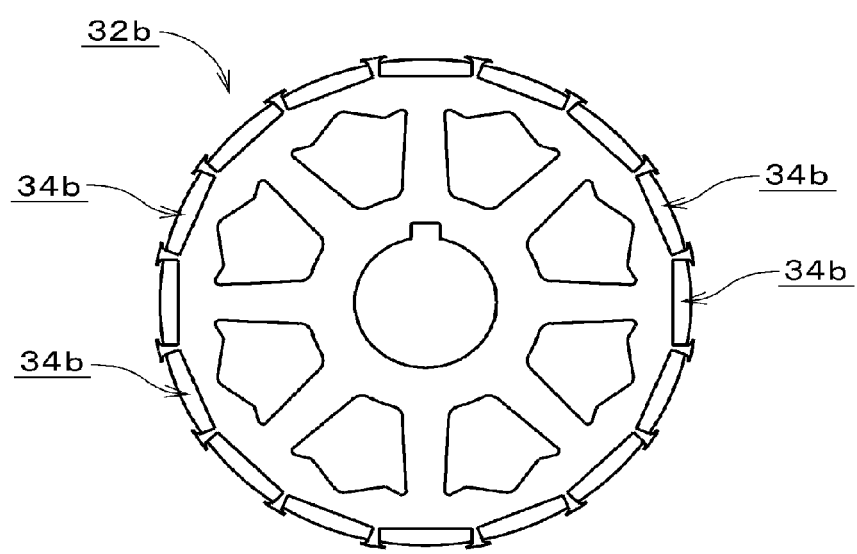
FIG. 17 is a view showing a rotor core of a motor according to a fourth preferred embodiment.

FIG. 17 is a view showing a rotor core 32b of a motor in accordance with a fourth preferred embodiment. On the outer circumferential surface of the rotor core 32b, there is provided a plurality of axially-extending groove-shaped magnet holding portions 34b. The magnet holding portions 34b are arranged adjacent to one another along the circumferential direction of the rotor core 32b. Just like the magnet holding portions 34 shown in FIG. 6, the magnet holding portions 34b extend from the upper end of the rotor core 32b to near the lower end thereof. Other structures of the motor in accordance with the fourth embodiment remain the same as those of the first preferred embodiment. The steps of assembling the motor are the same as those of the first preferred embodiment.

Figure 18:
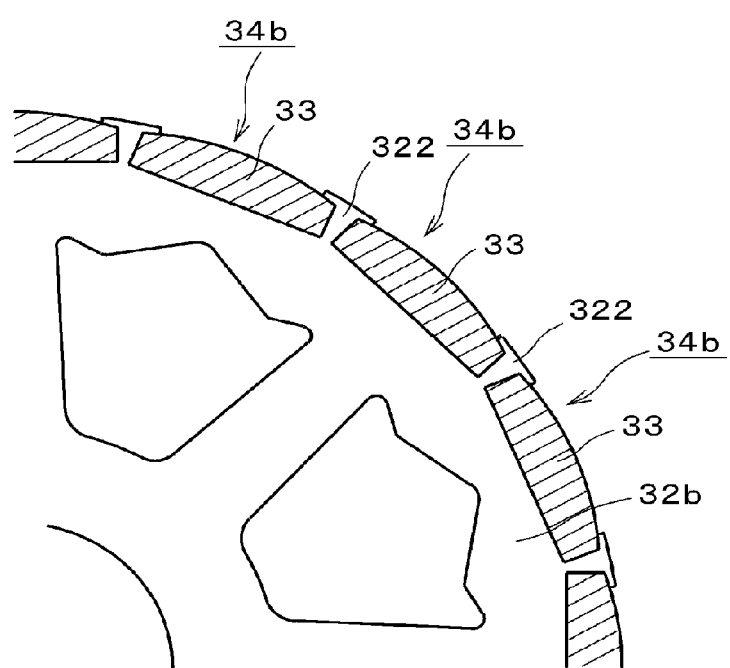
FIG. 18 is a view showing a rotor core and a rotor magnet.

FIG. 18 is a view showing the magnet holding portions 34b and the rotor magnets 33 on an enlarged scale. The rotor magnets 33 are hatched in FIG. 18. When the rotor magnets 33 are held in the magnet holding portions 34b, the radial outer surfaces of the rotor magnets 33 are exposed to the outside. Thus, the rotor magnets 33 can come closer to the tip ends of the teeth 224 shown in FIG. 4. At the circumferential opposite sides of each of the rotor magnets 33, the rotor core 32 partially protrudes radially outwards to form projection portions 322. The tip ends of the projection portions 322 are broadened to the circumferential opposite sides. Accordingly, the rotor magnets 33 are fixed not only in the circumferential direction but also in the radial direction and are reliably prevented from falling down. As in the first preferred embodiment, it is possible in the fourth preferred embodiment to easily and accurately assemble the motor.

While certain preferred embodiments have been described hereinabove, the present invention is not limited to the foregoing embodiments and may be modified in many different forms.

For example, in the first preferred embodiment, the magnet insertion hole may be defined only in the first plate portion 512 of the first housing member 211. This holds true in the fourth preferred embodiment. In this case, the magnet holding portions are formed to extend from the lower end of the rotor core 32 facing the magnet insertion hole to near the upper end thereof. This makes it possible to easily position the rotor magnets 33 in the axial direction. In the second preferred embodiment, a plurality of circumferentially-arranged magnet insertion holes may be provided only in the first plate portion 512. This holds true in the fourth preferred embodiment.

In the second and fourth preferred embodiments, just like the third preferred embodiment, the magnet holding portions 34 or 34b may axially extend through the rotor core 32 or 32b so that the rotor magnets 33 can be inserted into the magnet holding portions 34 or 34b at the upper and lower sides.

In the third preferred embodiment, the first magnet insertion hole 523a may be provided in a circumferentially deviated position with respect to the second magnet insertion hole 523b. Three or more rotor magnets 33 may be inserted into the magnet holding portion 34a. In the preferred embodiments described above, the cover member 231 may be fixed to the second plate portion 522 by welding or other fixing methods. The magnet insertion hole 523, 523a or 523b (hereinafter designated by "523" alone) may have a size great enough to axially overlap with the entirety of two or more magnet holding portions 34, 34a or 34b. The magnet insertion hole 523 may be formed into many different shapes other than the rectangular shape.

In the preferred embodiments described above, the housing 21 may be formed by upper and lower plate members for covering the upper and lower portions of the stator 22 and a cylinder member for covering the outer circumferential surface of the stator 22 in between the upper and lower plate members.

The second housing member 212 may have a disc-like shape. In this case, the upper end of the first cylinder portion 511 of the first housing member 211 is fixed to the outer edge portion of the second housing member 212. The second housing member 212 may be formed by a hub portion for holding the second bearing 42 and a plurality of rod-shaped portions extending radially outwards from the hub portion. In this case, the magnet insertion hole is formed between the rod-shaped portions in the circumferential direction. In addition, a cap member for covering the entirety of the second housing member 212 is provided in place of the cover member 231. In this manner, the second housing member 212 may be formed into many different shapes as far as it can serve as a bearing support member for supporting the second bearing 42.

In assembling the motor 1, 1a or 1b, the assembly of the shaft 31 and the rotor core 32, 32a or 32b (hereinafter designated by "32" alone) may be first attached to the second housing member 212 and then inserted into the first housing member 211. The lead lines 223a may be drawn out from the magnet insertion hole 523 after the assembly is supported on the first housing member 211 and the second housing member 212. The first bearing 41 may be fixed to the first plate portion 512 after the stator 22 is fixed to the first cylinder portion 511.

The method of reducing the cogging torque may be applied to motors having different combinations of the pole number and the slot number, e.g., an 8-pole/9-slot combination, an 8-pole/12-slot combination, a 10-pole/12-slot combination, a 12-pole/9-slot combination, a 14-pole/12-slot combination and a 16-pole/18-slot combination. Slide bearings may be used as the first bearing 41 and the second bearing 42.

The method of accurately fixing the rotor core 32 with respect to the stator 22 may be applied to rotating electrical machines other than the motor, e.g., an electric generator. In case of using an electric generator having an IPM structure, electric power is taken out from the stator 22 as the rotor magnets 33 rotate with respect to the stator 22.

The configurations of the preferred embodiments and the modified examples described above may be appropriately combined unless contradictory to one another.

INDUSTRIAL APPLICABILITY

The rotating electrical machine in accordance with the present invention can be used in: drive sources of an electric power assisted bicycle, an electric motorcycle, an electric car and the like; generators such as an electric generator, an wind power generator and a gas power generator; and drive sources of a power steering device and the like. In addition, the rotating electrical machine can be used for other purposes.

What is claimed is:
1. A method of manufacturing a rotating electrical machine, comprising the steps of:
   a) fixing a rotor core to a shaft;
   b) assembling a stationary assembly in which a first bearing is fixed to a housing bottom portion of a substantially cylindrical housing member having a closed bottom and in which an annular stator is fixed to an inner circumferential surface of a cylinder portion of the housing member;

c) inserting the rotor core into the stator while fitting a lower portion of the shaft into the first bearing;

d) fitting an upper portion of the shaft into a second bearing supported by a bearing support member;

e) fixing the bearing support member to an upper portion of the housing member; and f) axially inserting a plurality of rotor magnets into a plurality of axially-extending hole-shaped or groove-shaped magnet holding portions formed in the rotor core, through a magnet insertion hole defined in one of the bearing support member and the housing bottom portion.

2. The method of claim 1, further comprising the step of:
closing the magnet insertion hole with a cover member after the step f).

3. The method of claim 1, wherein said one of the bearing support member and the housing bottom portion has a plurality of magnet insertion holes including said magnet insertion hole and wherein, in the step f), the rotor magnets are inserted into the magnet holding portions through the magnet insertion holes.

4. The method of claim 1, wherein the magnet holding portions are formed to extend from an upper end of the rotor core to a lower end of the rotor core, the other of the bearing support member and the housing bottom portion having another magnet insertion hole, and wherein, in the step f), another plurality of rotor magnets are axially inserted into the magnet holding portions through said another magnet insertion hole.

5. The method of claim 1, further comprising the step of:
drawing out lead lines connected to the stator through the magnet insertion hole after the step b) and before the step e).

6. A rotating electrical machine, comprising:
a substantially cylindrical housing member having a closed bottom;
a first bearing fixed to a housing bottom portion of the housing member;
an annular stator fixed to an inner circumferential surface of a cylinder portion of the housing member;
a bearing support member fixed to a top portion of the housing member;
a second bearing supported on the bearing support member;
a rotor core arranged inside the stator;
a shaft to which the rotor core is fixed, the shaft having a portion positioned below the rotor core and supported on the first bearing and a portion positioned above the rotor core and supported on the second bearing; and
a plurality of rotor magnets axially inserted into and held by a plurality of axially-extending hole-shaped or groove-shaped magnet holding portions formed in the rotor core, one of the bearing support member and the housing bottom portion having a magnet insertion hole axially overlapping with the entirety of at least one of the magnet holding portions.

7. The machine of claim 6, further comprising:
a cover member arranged to close the magnet insertion hole.

8. The machine of claim 6, wherein said one of the bearing support member and the housing bottom portion has a plurality of magnet insertion holes including said magnet insertion hole.

9. The machine of claim 6, wherein lead lines are connected to the stator and drawn out through the magnet insertion hole.

10. The machine of claim 7, wherein the cover member has an opening into which a bush is inserted, lead lines connected to the stator and drawn out through the bush, the cover member attached to the magnet insertion hole through a seal member.

11. The machine of claim 6, wherein the rotor core is formed of laminated steel plates, the magnet insertion hole provided in only said one of the bearing support member and the housing bottom portion, the magnet holding portions formed to extend from one end of the rotor core facing the magnet insertion hole to near the other end of the rotor core.

12. The machine of claim 6, wherein the magnet holding portions are formed to extend from an upper end of the rotor core to a lower end of the rotor core, the other of the bearing support member and the housing bottom portion having another magnet insertion hole.

13. The machine of claim 6, wherein the stator core includes an annular core back and a plurality of teeth arranged at a regular pitch in a circumferential direction, the teeth extending from the core back toward the rotor core, each of the teeth including a tip end surface having a reference tip end surface and at least one protrusion protruding from the reference tip end surface toward each of the rotor magnets, and wherein, when a number obtained by subtracting 1 from a quotient of a least common multiple of a slot number and a pole number divided by the slot number is assumed to be a maximum protrusion arrangement number, said at least one protrusion is arranged in at least one predetermined position among suitable protrusion arrangement positions defined by equally dividing the distance between slot gaps positioned at the opposite sides of each of the teeth by the maximum protrusion arrangement number plus 1 in the circumferential direction.

14. The machine of claim 6, wherein the stator core includes an annular core back and a plurality of teeth arranged at a regular pitch in a circumferential direction, the teeth extending from the core back toward the rotor core, each of the teeth including a tip end surface having a reference tip end surface and at least one protrusion protruding from the reference tip end surface toward each of the rotor magnets, and wherein, when a quotient of a least common multiple of a slot number and a pole number divided by the slot number is assumed to be a maximum protrusion arrangement number, said at least one protrusion is arranged in at least one predetermined position among suitable protrusion arrangement positions which are circumferential center positions of plural regions defined by equally dividing the distance between slot gaps positioned at the opposite sides of each of the teeth into the same number as the maximum protrusion arrangement number in the circumferential direction.

* * * * *